(12) United States Patent
Ranganathan

(10) Patent No.: US 10,120,904 B2
(45) Date of Patent: Nov. 6, 2018

(54) RESOURCE MANAGEMENT IN A DISTRIBUTED COMPUTING ENVIRONMENT

(71) Applicant: Cloudera, Inc., Palo Alto, CA (US)

(72) Inventor: Jairam Ranganathan, Palo Alto, CA (US)

(73) Assignee: Cloudera, Inc., Palo Alto, CA (US)

( * ) Notice: Subject to any disclaimer, the term of this patent is extended or adjusted under 35 U.S.C. 154(b) by 458 days.

(21) Appl. No.: 14/588,250

(22) Filed: Dec. 31, 2014

(65) Prior Publication Data

US 2016/0188594 A1     Jun. 30, 2016

(51) Int. Cl.
G06F 17/30     (2006.01)
G06F 9/50     (2006.01)

(52) U.S. Cl.
CPC ........ *G06F 17/3048* (2013.01); *G06F 9/5066* (2013.01); *G06F 9/5083* (2013.01); *G06F 17/30194* (2013.01); *G06F 2209/505* (2013.01)

(58) Field of Classification Search
USPC ................................. 707/706, 769
See application file for complete search history.

(56) References Cited

U.S. PATENT DOCUMENTS

| | | | |
|---|---|---|---|
| 5,825,877 A | 10/1998 | Dan et al. | |
| 6,438,553 B1 * | 8/2002 | Yamada | G06F 9/505 |
| 6,678,828 B1 | 1/2004 | Pham et al. | |
| 6,931,530 B2 | 8/2005 | Pham et al. | |
| 7,143,288 B2 | 11/2006 | Pham et al. | |
| 8,024,560 B1 | 9/2011 | Alten | |
| 8,306,919 B2 | 11/2012 | Sakamura et al. | |
| 8,667,267 B1 | 3/2014 | Garcia et al. | |
| 8,788,815 B1 | 7/2014 | Garcia et al. | |
| 8,821,602 B2 | 9/2014 | McAlister | |
| 9,112,813 B2 * | 8/2015 | Jackson | G06F 9/5027 |
| 9,430,264 B2 * | 8/2016 | Tang | G06F 9/45545 |

(Continued)

OTHER PUBLICATIONS

Babaoglu, O., and K. Marzullo, "Consistent global states of distributed systems: Fundamental concepts and mechanisms," Distributed Systems, 53 pages, Jan. 1993.

(Continued)

*Primary Examiner* — Kim Nguyen
(74) *Attorney, Agent, or Firm* — Perkins Coie LLP

(57) ABSTRACT

Systems and methods are disclosed for resource management in a distributed computing environment. In some embodiments, a resource manager for a large distributed cluster needs to be able to provide resource responses very quickly. But each query may also not be accurate in initial resource request and will often have to come back to the resource manager multiple times. An artifact may provide low latency query responses by using resource request caching that can handle re-requests of resources. According to some embodiments, a queuing mechanism may take into account resources currently expended and any resource requirement estimates available in order to make queuing decisions that meet policies set by an administrator. In some embodiments, scheduling decisions are distribute across a cluster of computing systems while still maintaining approximate compliance with resource management policies set by an administrator.

7 Claims, 9 Drawing Sheets

(56) References Cited

U.S. PATENT DOCUMENTS

| | | |
|---|---|---|
| 2002/0073322 A1 | 6/2002 | Park et al. |
| 2005/0171983 A1 | 8/2005 | Deo et al. |
| 2005/0182749 A1 | 8/2005 | Matsui |
| 2006/0050877 A1 | 3/2006 | Nakamura |
| 2006/0143453 A1 | 6/2006 | Imamoto et al. |
| 2006/0156018 A1 | 7/2006 | Lauer et al. |
| 2007/0177737 A1 | 8/2007 | Jung et al. |
| 2007/0180255 A1 | 8/2007 | Hanada et al. |
| 2007/0186112 A1 | 8/2007 | Perlin et al. |
| 2007/0226488 A1 | 9/2007 | Lin et al. |
| 2007/0255943 A1 | 11/2007 | Kern et al. |
| 2009/0259838 A1 | 10/2009 | Lin |
| 2009/0307783 A1 | 12/2009 | Maeda et al. |
| 2010/0008509 A1 | 1/2010 | Matsushita et al. |
| 2010/0198972 A1 | 8/2010 | Umbehocker |
| 2010/0296652 A1 | 11/2010 | Nakayama et al. |
| 2010/0325713 A1 | 12/2010 | Kurita et al. |
| 2011/0055578 A1 | 3/2011 | Resch |
| 2011/0078549 A1 | 3/2011 | Thueringer et al. |
| 2011/0302417 A1 | 12/2011 | Whillock et al. |
| 2012/0036357 A1 | 2/2012 | Struik |
| 2012/0130874 A1 | 5/2012 | Mane et al. |
| 2012/0131341 A1 | 5/2012 | Mane et al. |
| 2013/0054976 A1 | 2/2013 | Brown et al. |
| 2015/0277979 A1* | 10/2015 | Chen ............... G06F 9/5011 718/104 |
| 2016/0063058 A1* | 3/2016 | Spehr ............ G06F 17/30448 707/770 |
| 2016/0210332 A1* | 7/2016 | Milton ............ G06F 17/30551 |
| 2016/0241486 A1* | 8/2016 | Jiao .................... H04L 67/10 |
| 2017/0220646 A1* | 8/2017 | Schechter ....... G06F 17/30545 |
| 2017/0262518 A1* | 9/2017 | Messer ........... G06F 17/30584 |

OTHER PUBLICATIONS

Cheng, Security Attack Safe Mobil and Cloud-Based One-Time Password Tokens Using Rubbing Encryption Algorithm, ACM, Jun. 2011, pp. 304-336.

Corbett et al., "Spanner: Google's Globally Distributed Database," Transactions on Computer Systems (TOCS), vol. 31, No. 3, 14 pages, Aug. 2013.

Du et al., "A Pairwise Key Predistribution Scheme for Wireless Sensor Networks," ACM, May 2005, vol. 8 Issue 2, pp. 228-258.

Kim et al., Design and Implementation of a Private and Public Key Crypto Processor and Its Application to a Security System, IEEE, Feb. 2004, vol. 50, Issue 1, pp. 214-224.

Ko et al., "A Study of Encryption Algorithm for RFID tag (SEED: 8 Rounds X 64 bit block)," IEEE, s008, pp. 672-677.

Lamport, L., "Time, clocks, and the ordering of events in a distributed system," Communications of the ACM, vol. 21, No. 7, pp. 558-565, Jul. 1978.

Non-Final Office Action for U.S. Appl. No. 13/362,695, dated Apr. 29, 2013, 23 pgs.

Stoller,S.D., "Detecting global predicates in distributed systems with clocks," Distributed Computing, vol. 13, No. 2, pp. 85-98, Feb. 2000.

\* cited by examiner

RESOURCE MANAGEMENT IN A DISTRIBUTED COMPUTING ENVIRONMENT

BACKGROUND

Apache Hadoop project (hereinafter "Hadoop") is an open-source software framework for developing software for reliable, scalable and distributed processing of large data sets across clusters of commodity machines. Hadoop includes a distributed file system, known as Hadoop Distributed File System (HDFS). HDFS links together the file systems on local nodes to form a unified file system that spans an entire Hadoop cluster. Hadoop is also supplemented by other Apache projects including Apache Hive (hereinafter "Hive") and Apache HBase (hereinafter "HBase"). Hive is a data warehouse infrastructure that provides data summarization and ad hoc querying. HBase is a scalable, distributed NoSQL (No Structured Query Language) database or data store that supports structured data storage for large tables. Hadoop also includes Hadoop YARN ("Yet Another Resource Negotiator) that provides a basic framework for job scheduling and cluster resource management that is utilized by a programming framework known as MapReduce. However, more effective methods are required to support low-latency query responses than as provided through YARN.

BRIEF DESCRIPTION OF THE DRAWINGS

The present embodiments are illustrated by way of example and are not intended to be limited by the figures of the accompanying drawings. In the drawings.

DETAILED DESCRIPTION

Figure 1:
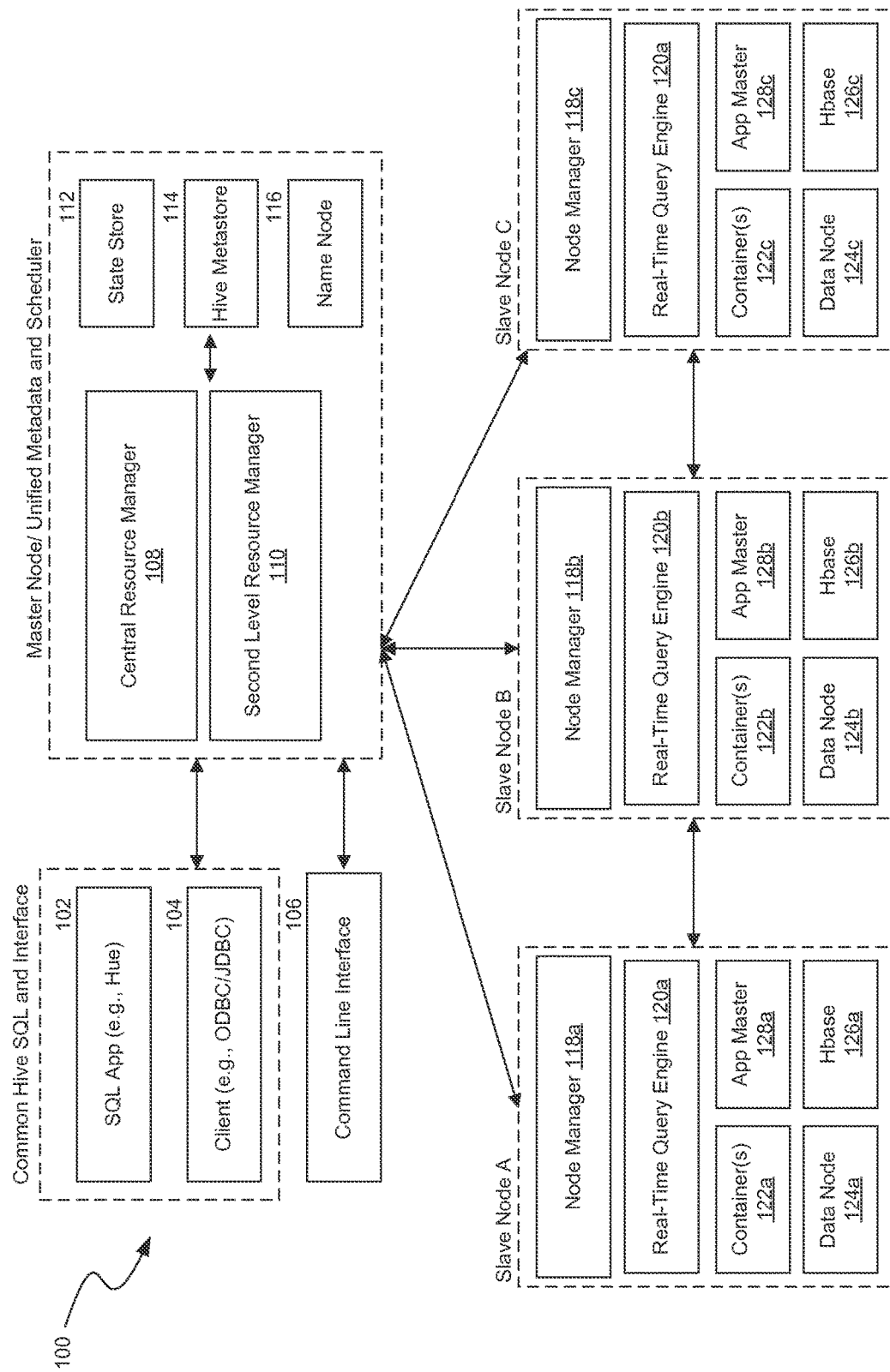
FIG. 1 shows a high-level diagram illustrating an example environment in which resource management may be deployed.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include a resource management engine for processing queries in a distributed computing cluster. For illustrative purposes, the following embodiments are described in the context of a Hadoop distributed computing system implementing a Hadoop Distributed File System (HDFS), however it shall be appreciated that the disclosed subject matter is not limited to Hadoop-based implementations. The disclosed teachings, may be applied to managing resources for processing queries in any type of distributed computing cluster.

Distributed Computing Environment

FIG. 1 shows a high-level diagram illustrating an example environment 100 in which resource management may be deployed. It shall be understood that example environment 100 is shown for illustrative purposes, and is not to be construed as limiting. More or fewer components than as shown in FIG. 1 may be included while remaining within the scope of the present teachings. The environment 100 includes a plurality of data nodes 124a-c that comprise a Hadoop cluster. Some of the data nodes 124a-c may run just HDFS, while others may run HBase region servers 126a-c.

The environment 100 includes a client 104 such as Java Database Connectivity (JDBC) client, Open Database Connectivity (ODBC) client, and the like that provides API and other tools for connecting and/or accessing a Hadoop distributed computing cluster. SQL applications 102 such as Hue, provide a an interface through which users can run queries or jobs, browse the HDFS, create workflows and the like. The environment 100 also includes a command line interface 106 for issuing queries. In one embodiment, the client 104, the SQL application 102 and the command line interface 106, each or together may be commonly referred to as a client.

The environment 100 includes a central resource manager 108 and in some embodiments a secondary resource manager 110. A "resource" in this context may be generally understood to include processing capabilities of the cluster nodes in the distributed computing environment. For example, resources may include processing units (e.g. CPU cores), memory, network bandwidth, and storage space. Resources may be abstracted into units called containers (e.g. containers 122a-c) that may include one or more of the previously mentioned resources. The central resource manager 108 is a general resource manager configured to manage and arbitrate resources among applications in the system, according to known techniques of resource management. Communicating with node managers 118a-c which act as the slave agents at each node, the central resource manager 108 may allocate and schedule resources available at the various nodes based on the available resources reported from each node manager 108. In other words, queuing processing tasks until resources are made available. In Hadoop, this basic system of negotiation between a central resource manager 108 and node managers 118a-c is sometimes referred to as Yet Another Resource Negotiator (YARN). A central resource manager 108 implementing known resource management techniques (such as in YARN) is limited in its ability to produce low latency responses to queries. To address this limitation, environment 100 may include a second level resource manager 110 capable of implementing novel techniques for resource management as discussed in more detail herein. Secondary level resource manager 110 is shown in FIG. 1 as discrete module separate from central resource manager 108, however it shall be understood that this shows an non-limiting example for illustrative purposes. According to some embodiments, the functionality of the secondary resource manager 110 may be integrated into the central resource manager 108. In other words, the novel methods and systems described herein may be implemented on top of an existing resource management architecture (e.g. YARN), or may be integrated into a new resource management system, according to some embodiments.

The environment 100 further includes unified metadata components such as a Hive metastore 114, an name node 116 (e.g., HDFS name node) and/or a state store 112. The Hive metastore 114 includes information about the data available to the various engines within the environment 100. Specifically, the Hive metastore 114 includes the schemas for the data stored on the data nodes 124a-c. The name node (NN) 116 includes the details of the distribution of files across the data nodes 124a-c to optimize local reads. In one implementation, the name node 116 may include information concerning disk volumes the files sit on, on an individual node.

The state store 112 is a global system repository which runs on a single node in the cluster. The state store 112 in one implementation can be used as a name service. All low latency (LL) query engine daemons, at start up, can register with the state store to be a member and get existing membership information specifying all the low latency (LL) query engine daemons that are running on the cluster. The state store 112, in a further implementation, can be used to provide metadata for running queries. In further implementations, copies of data or metadata form state store 112 may be pushed and or pulled to the node managers 118a-c to inform local scheduling decisions. The state store 112 can cache metadata and distribute the metadata to the node managers 118a-c and/or low latency (LL) query engine daemons 120a-c at start up or at regular or irregular intervals. When the state store fails, the rest of the system may continue to operate based on last information received from the state store. In a further implementation, the state store can store and distribute other system information such as load information, diagnostics information, and the like that may be used to improve the functioning and/or performance of the Hadoop cluster.

A low latency (LL) query engine daemon 120a-c may run on each of the data nodes. A low latency (LL) query engine daemon is a long running process that coordinates and executes queries. Each low latency (LL) query engine daemon 120a-c can receive, plan and coordinate queries received via the client's 102/104. For example, a low latency (LL) query engine daemon can divide a query into fragments, which are distributed among remote nodes of the computing cluster running additional low latency (LL) query engine daemons for execution in parallel. The queries are executed directly on the HDFS (e.g., data nodes 124a-c) and/or HBase (e.g., 126a-c).

According to some embodiments, a format conversion engine daemon (not shown) may also run on each of the data nodes. The format conversion engine daemon is a long running process that converts data from its original format to a condensed format that is conducive to relational database processing, such as the columnar format Parquet. The conversion can be performed at one or more time points. The converted data is saved on the data node together with the original, unconverted data, both available to the low latency (LL) query engine. According to some embodiments, the format conversion engine daemon may be part of the low latency (LL) query engine daemon 120a-c.

Figure 2:
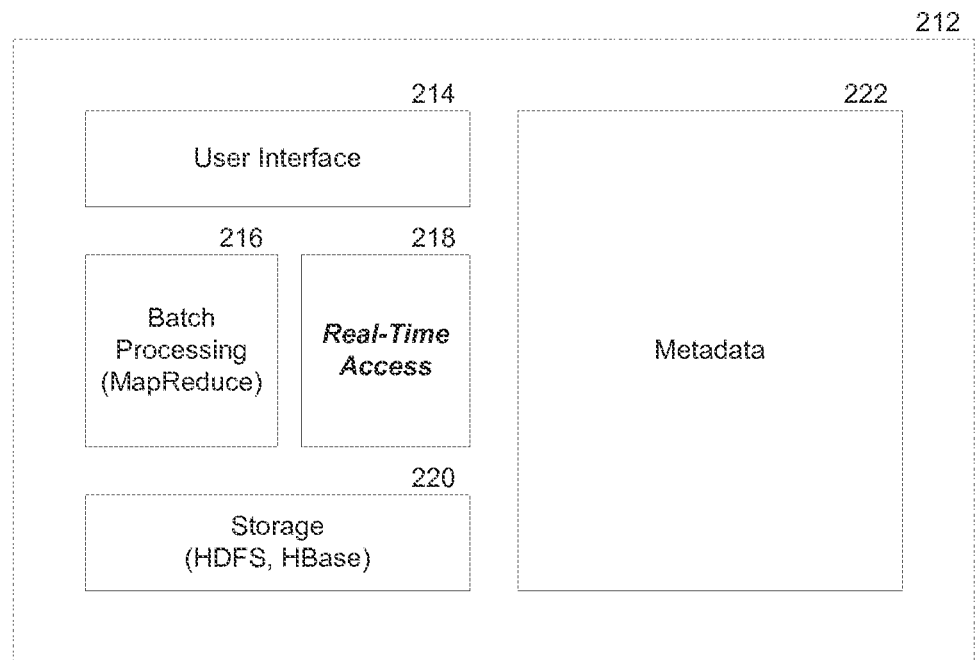
FIG. 2 shows a block diagram illustrating example components of a unified distributed computing platform supporting resource management of batch-oriented and real-time, ad hoc queries.

FIG. 2 shows a block diagram illustrating example components of a unified distributed computing platform 212 supporting batch-oriented and real-time, ad hoc queries. The unified Hadoop platform 212 supports distributed processing and distributed storage. The unified Hadoop platform 212 includes a user interface 214, storage 220 and metadata 222 components. The user interface 214 includes Hive interfaces such as ODBC driver, JDBC driver, Hue Beeswax, and the like. The user interface 214 also includes SQL support. Via the user interface 214, queries can be issued, data can be read from or written to storage 220, etc. Through the interface, an administrator user can set policies for resource allocation in processing queries. These policies may inform resource allocation by a central resource manager 108 or secondary resource manager 110. The storage 220 includes HDFS and/or HBase storage. The HDFS may support various file formats, including but not limited to: text file, sequence file, RC file, Avro, and the like. Various compression codecs including snappy, gzip, deflate, bzip, and the like may also be supported. The metadata 222 may include, for example, information about tables, their partitions, columns, types, table/block locations, and the like. The metadata 222 may leverage existing I-live metastore, which includes a mapping of HBase tables, predicates on row key columns mapped into start/stop row, predicates on other columns mapped into single column value filters, and the like.

According to some embodiments, a Hadoop platform uses a batch-oriented query engine (i.e., MapReduce) for batch processing 216 of data. The batch processing capability of MapReduce is complemented by a real-time access component 218 in the unified Hadoop platform 212. The real-time access component 218 allows real-time, ad hoc SQL queries to be performed directly on the unified storage 220 via a distributed low latency (LL) query engine that is optimized for low-latency. Resources (i.e. The real-time access component 218 can thus support both queries and analytics on big data.

Figure 3:
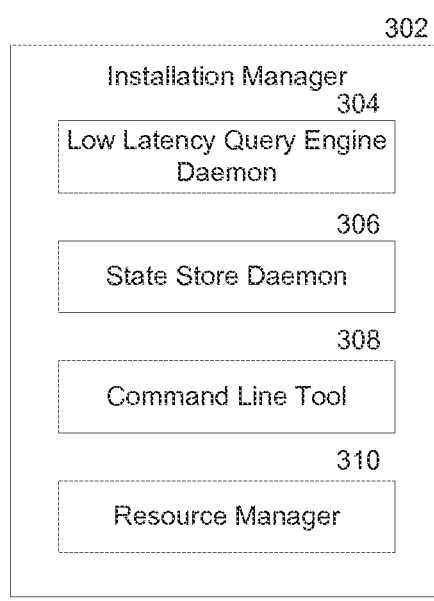
FIG. 3 shows a block diagram illustrating example components of an installation manager for installing components of the various engines in a an example distributed computing environment.

FIG. 3 shows a block diagram illustrating example components of an installation manager 302 for installing components of the various engines in a distributed computing environment (e.g., environment 100) to provide resource management of interactive, real-time queries directly on a unified storage layer. The installation manager 302 can automatically install, configure, manage and monitor the various engines. Alternately, the engines may be installed manually. The installation manger 302 installs binaries including a low latency (LL) query engine daemon 304, a state store daemon 306, a low latency (LL) query engine shell 308 and resource manager daemons 310. As described above, the low latency (LL) query engine daemon 304 is a service or process that plans and executes queries against HDFS and/or HBase data. It is installed on each data node in the cluster. The state store daemon 306 is a name service that tracks the location and status of all the low latency (LL) query engine daemons in the cluster. The state store daemon 306 can also be a metadata store for providing metadata and/or other diagnostic information in some implementations. The low latency (LL) query engine shell 308 is a command line interface for issuing queries to a low latency (LL) query engine daemon, and is installed on a client. The resource manager daemons 310 make up a service or process that allocates and schedules resources in the distributed computing environment. Resource manager daemons may be installed on the master node(s) as part of or comprising the central resource manager 108 and/or secondary resource manager 110 and on slave nodes as part of or comprising the node managers 118*a-c*.

Figure 4:
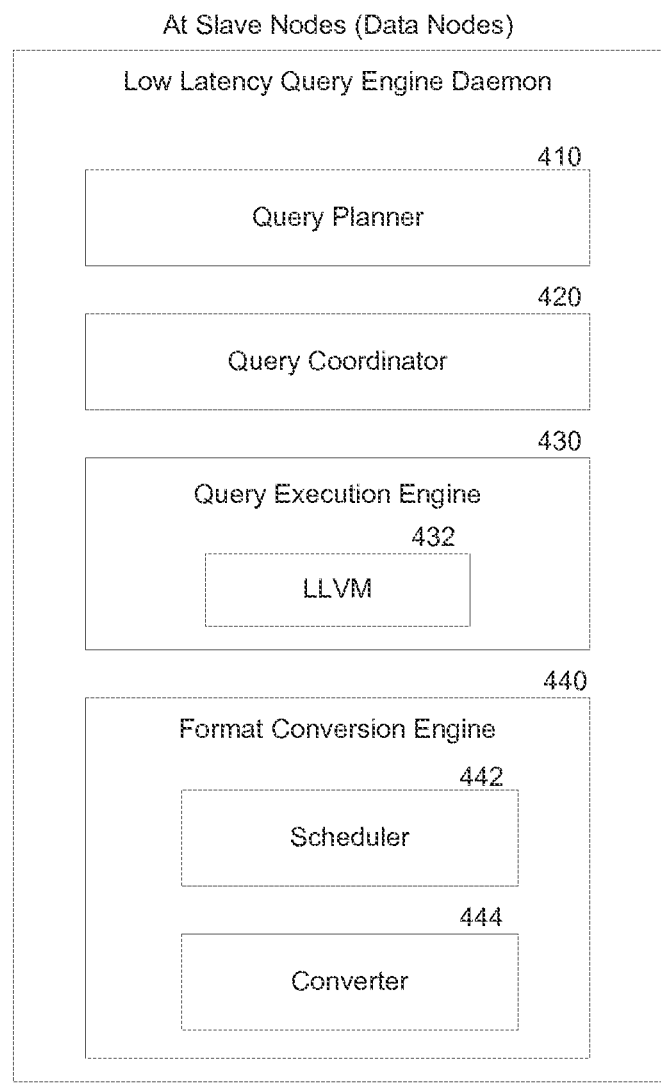
FIG. 4 shows a block diagram illustrating example components of a low latency (LL) query engine daemon installed at slave nodes in a distributed computing cluster.

FIG. 4 shows a block diagram illustrating example components of a low latency (LL) query engine daemon installed at slave nodes in a distributed computing cluster. A low latency (LL) query engine daemon includes a query planner 410, a query coordinator 420, a query execution engine 430, and a format conversion engine 440, in one embodiment.

The query planner 410 turns query requests from clients into collections of plan fragments based on stored schemas, and provides the plan fragments to the query coordinator 420. The query planner 410 may constitute the front end of the low latency (LL) query engine daemon written in Java or another suitable language to facilitate interaction with the rest of the Hadoop environment, such as the Hive metastore, the state store, APIs, and the like. The query planner 410 can use various operators such as Scan, HashJoin, HashAggregation, Union, TopN, Exchange, and the like to construct a query plan. Each operator can either materialize or generate data or combine data in some way. In one implementation, for example, the query planner 410 can create a lefty plan or tree of one or more operators (e.g., manually or using an optimizer). The scan operator allows a plan to be broken up along scan lines or boundaries. Specialized scan nodes may be present for different storage managers. For example, there may be an HDFS scan node and an HBase scan node, each of which can internally employ different processes for different file formats. Some plans combine data for hash aggregation which can fill up a hash table and then output the aggregate results. A union operator can merge the output from different plan fragments. A TopN operator can be the equivalent of order by with a limit. The exchange operator can handle the data exchange between two plan fragments running on two different nodes.

The query coordinator 420 initiates execution of the plan fragments across all the low latency (LL) query engine daemons that are involved in the query. The query coordinator 420 uses the membership information from the state store and/or the location information for the data blocks from HDFS the Name Node to determine or identify the low latency (LL) query engine daemons for executing query plan fragments. In one implementation, the query coordinator 420 can also apply any predicates from the query to narrow down to the set of files and blocks against which the plan fragments should be run. The query coordinator 420 can also perform the final aggregation or merge of data from the low latency (LL) query engine daemons on remote data nodes. In one implementation, the low latency (LL) query engine daemons may pre-aggregate some of the data, thereby distributing the aggregation across the data nodes and speeding up the query processing.

The query execution engine 430 executes the planned query fragments locally on the HDFS and HBase. For example, it runs the scan and/or any other query operators. The query execution engine 430 is written in C++, but may also be written in any other suitable language, such as Java. The query execution engine 430 is an execution engine that is separate from MapReduce. While the query execution engine 430 accesses the infrastructure that provides the data (e.g., HDFS and HBase), it does not necessarily utilize any of the infrastructures that support map reductions, such as job trackers and task trackers.

In one embodiment, initially, data comes in and is stored in their original format on the HDFS data nodes. One or more associated schemas comprising information on file formats in which data is stored, which can be created by a user or an administrator, are saved separately in the Hive metastore 114, at the same time as the data is stored or at a later time. In one embodiment, after a query is submitted, a query execution engine 430 on a data node which is to execute certain planned query fragments locally first transforms the files on the data node according to the schemas. Specifically, the query execution engine 430 reads a schema, which contains information on row and column endings, for example, for the files from the Hive metastore. It then reads the files from the data node, parses them in accordance with the file formats specified in the schema, and transforms the parsed data into a series of in-memory tuples according to further information in the schema. At that time, the query execution engine 430 is ready to execute the planned query fragments locally against the transformation result.

In one embodiment, the query execution engine 430 can include a low level virtual machine (LLVM) 432, an optimizer, or other compiler infrastructure, for run-time code generation in order to transform interpretive code into a format that can be efficiently executed by the central processing unit (CPU). A typical RDBMS, for instance, has interpretive code for evaluating expressions to extract data from indices and the like. The query execution engine 320 handles this issue by using low level virtual machines (LLVMs) to more tightly couple code with hardware. For example, an expression where A equals B over A+B equals C in a query can be evaluated by making three function calls. Instead of making the three function calls, an LLVM uses the operations that the CPU provides in order to evaluate the expression and achieve speed gains.

In a further embodiment, the low latency (LL) query engine daemon can also use special CPU instructions, in order to, for example, perform text processing and/or other resource intensive processes. By way of another example, hash value computations may be performed using a special Cyclic Redundancy Check (CRC32) instruction to achieve speed gains.

In one embodiment, the low latency (LL) query engine provides the advantage of low latency which allows users to query large volumes of data and obtain answers at much faster speed than possible using the existing batch processing framework of Hive and MapReduce. In a further embodiment, the real-time query engine provides flexibility in applying schemas used to search for hidden insights in large volumes of data.

It takes different amounts of time for a query execution engine to parse and transform data in different file formats. In general, the amount of time decreases when the file format is more conducive to relational database processing in response to SQL-like queries. Therefore, a format conversion engine 440 converts data to such a file format in the background to increase the efficiency of query processing at runtime. While this may increase query processing efficiency, it shall be understood that scheduled format conversion is not a necessary component of the present disclosure. In one embodiment, the format conversion engine 440 includes a scheduler 442 and a converter 444. The scheduler 442 determines when to perform the format conversion based on input by an administrator or a user, and notifies the converter when the time comes. In one example, the scheduler 442 uses a timer for performing the format conversion periodically or at certain points in the future. The certain point in the future could be measured from the occurrence of an event, such as the creation, initial update, or last update of the data. In other examples, the conversion is performed when the data has been updated, searched, searched with the same queries, and so on, for a certain number of times. Accordingly, the scheduler 442 keeps a counter of the total number of updates, of all queries, of specific queries, of distinct queries, and so on, so that the format conversion can be performed when the criteria involving these numbers are met. In further examples, the status of resource utilization on the data node is taken into consideration in scheduling the format conversion.

In one embodiment, the scheduler 442 maintains one schedule for each piece of data on the data node, for each original format, for each target format, for each pair of an original format and a target format, etc. In another embodiment, the scheduler 442 determines when to delete the conversion results from the data node, which can be similar to the determination of when to perform the format conversion, and notifies the converter 444 when the time comes. While a scheduler 442 of a format conversion engine daemon may work independently, it can also coordinate with the scheduler of another format conversion engine daemon to perform the format conversion in a systematic fashion across multiple data nodes or even the entire cluster.

The converter 444 performs the format conversion upon receiving a notification from the scheduler 442. In one embodiment, the converter 444 maintains a list of one or more target formats. It converts the data on the data node to one of the target formats based on input by an administrator a user, and saves the converted data on the data node along with the original data. For example, the converter 444 may read a file in the CSV format from the data node into memory, parse the file in accordance with the CSV format, convert it into a chosen Parquet format, and saves the file in the Parquet format on the data node together with the file in the CSV format. In one embodiment, the conversion may be fully automated between certain original formats and target formats, possibly based on specific schemas stored in the Hive metastore 114. For instance, every field in a CSV file can be automatically converted into a column in a Parquet file. The conversion may also be customized by an administrator or a user, who may decide to convert an input file into multiple output files in the same target format or different ones, each having select fields in the input file arranged in a specific order, for example. In another embodiment, the converter 444 also deletes certain conversion results upon receiving a notification from the scheduler 442.

As a target format is typically a condensed format that is conducive to relational database processing, having data ready in a target format speeds up processing of SQL-like queries. As the format conversion is performed at carefully selected time points in the background, it tends to minimize the use of resources and interference with other operations on the data nodes.

With the format conversion engine daemon, in one embodiment, after a query is submitted, a query planner would set up the plan fragments to indicate that converted data is available. The query execution engine on a data node then no longer needs to perform a complex transformation of the data on the data node. It can simply read the converted data from the data node, which would essentially be in a tuple form. The format conversion engine daemon therefore provides some benefits of the schema-on-write model by reducing the processing time when the data is used in query processing, without suffering some costs of the model, which requires a large processing time when the data is uploaded and updated.

Figure 5A:
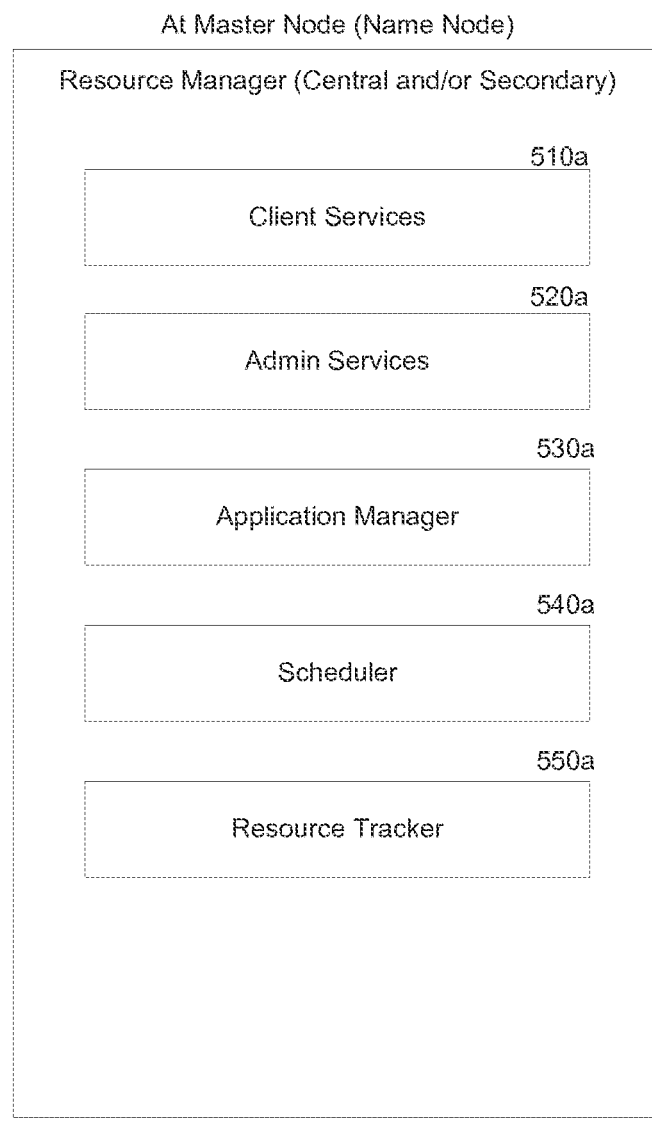
FIG. 5A shows a block diagram illustrating example components of a resource manager daemon installed at a master node in a distributed computing cluster

FIG. 5A shows a block diagram illustrating example components of a resource manager daemon installed at a master node in a distributed computing cluster. The resource manager daemon shown in FIG. 5A may include components of a central resource manager 108 and/or secondary resource manager 110 as shown in FIG. 1. Further, the conceptualized diagram of a resource manager daemon shown in FIG. 5A is an illustrative example according to one embodiment and is not to be construed as limiting. A similar resource manager include more or fewer components, organized in various configurations, while remaining within the scope of the present disclosure.

According to one embodiment, a resource manager daemon includes a client services module 510a, an administrator services module 520a, an application manager 530a, a scheduler 540a, and a resource tracker 550a.

The client services module 510a provides the interface between the client (e.g., client 102/104) and the resource manager (e.g. resource manager 108/110). For example, the client services module 510a may handle communications (e.g., in the form of remote procedure calls) for requested operations (e.g. a query) to be performed on the cluster.

The administrator services module 520a provides the interface provides the interface between the client (e.g., client 102/104) and the resource manager (e.g. resource manager 108/110) for administrator services. Further, the administrator services module 520a can prioritize operations requests from administrators over normal users. An administrator can set resource management policies to be followed by the scheduler 540a via the administrator services module 520a.

The application manager 530a is responsible for maintaining a collection of submitted "applications" or jobs. In this context, the terms "jobs" and "applications" may be used interchangeably, however an application may also include a set of jobs. For example, a MapReduce job may be considered an "application" or a software application such as a Hive instance may be considered an "application" comprising a number of MapReduce jobs at any given time. Further, different instances or accounts for the same software application may be considered distinct applications by the Application Manager 530a. For example, in an enterprise setting, various departments may have access to Hive-based software for processing queries using a Hadoop Cluster. Each department's use of the software may be separately managed as an "application." The application manager 530a may also include an application master service responsible for communicating with all the application masters 520b at the slave nodes. The application master service can register new application masters 520b, terminate and/or unregister requests from finishing application masters 520b, and obtain container allocation or de-allocation requests from running application masters 520b.

The scheduler 540a is responsible for allocating resources to the various applications subject to constraints queues and policies set by an administrator user. Scheduling is performed based on scheduling algorithms that take into consideration the resource requirements (e.g. memory, processing, storage, and network bandwidth) of the submitted applications, the administrator policy requirements, and other constraints. Novel scheduling algorithms are discussed herein with respect to FIGS. 6-8.

The resource tracker 550a responds to remote procedure calls from all the slave nodes. It monitors available resources at the nodes, by receiving status updates from the nodes. The resource tracker 550a may also decommission resources at nodes if it does not receive status updates indicating that the node is operational. The resource tracker 550a maintains a list of active and decommissioned nodes and feeds this information to the scheduler 540a to aid in resource allocation.

Figure 5B:
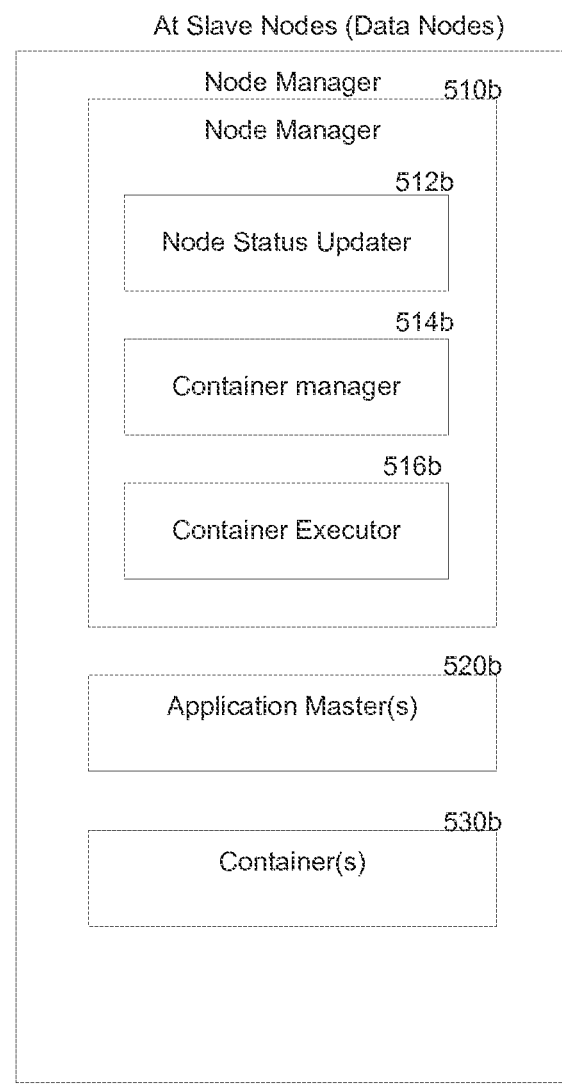
FIG. 5B shows a block diagram illustrating example components of a resource manager daemon installed at slave nodes in a distributed computing cluster.

FIG. 5B shows a block diagram illustrating example components of a resource manager daemon installed at slave nodes in a distributed computing cluster, according to some embodiments. The conceptualized diagram of a resource manager daemon shown in FIG. 5B is an illustrative example according to one embodiment and is not to be construed as limiting. A similar resource manager include more or fewer components, organized in various configurations, while remaining within the scope of the present disclosure.

According to one embodiment, a resource manager daemon installed at the slave nodes includes a node manager 510b, and one or more application masters 520b. Resources at the slave nodes are abstracted to on e or more containers 530b.

The node manager 510b is a per-node agent installed on each of the slave nodes of a Hadoop cluster. The node manager 510b includes a node status updater 512b that registers with the resource manager and broadcasts the status of the node including the status of available resources (e.g. containers 530b) at the node. Status updates may include information about new allocated containers, completed containers, unavailable containers, etc. The node manager 510b also includes a container manager 514b. The node container manager 514b accepts requests from application masters 520b for resources, for example, to start running new containers 530b or stop running old ones, launches and monitors containers 530b at the node, closes containers and/or cleans up processes running in containers in response to requests from the resource manager 108/110, and monitors the containers 514b for resource utilization while processes are running. According to some embodiments, if a container 530b exceeds its resource allocation, the node container manager 514b can kill the errant container so that it does not adversely affect other containers running on the same node. The node manager 510b also includes a container executor 516b that interacts with underlying operating systems to place files and directories and to securely launch and clean up processes running on containers.

Application masters 520b that are specific to each application running on the cluster may be instantiated at each slave node. Application masters 520b are responsible for requesting resources from the resource manager 108/110, working with node managers 510b to manage and monitor the containers 530b allocated by the resource manager 108/110.

Expandable Resource Reservations with Caching

Figure 6:
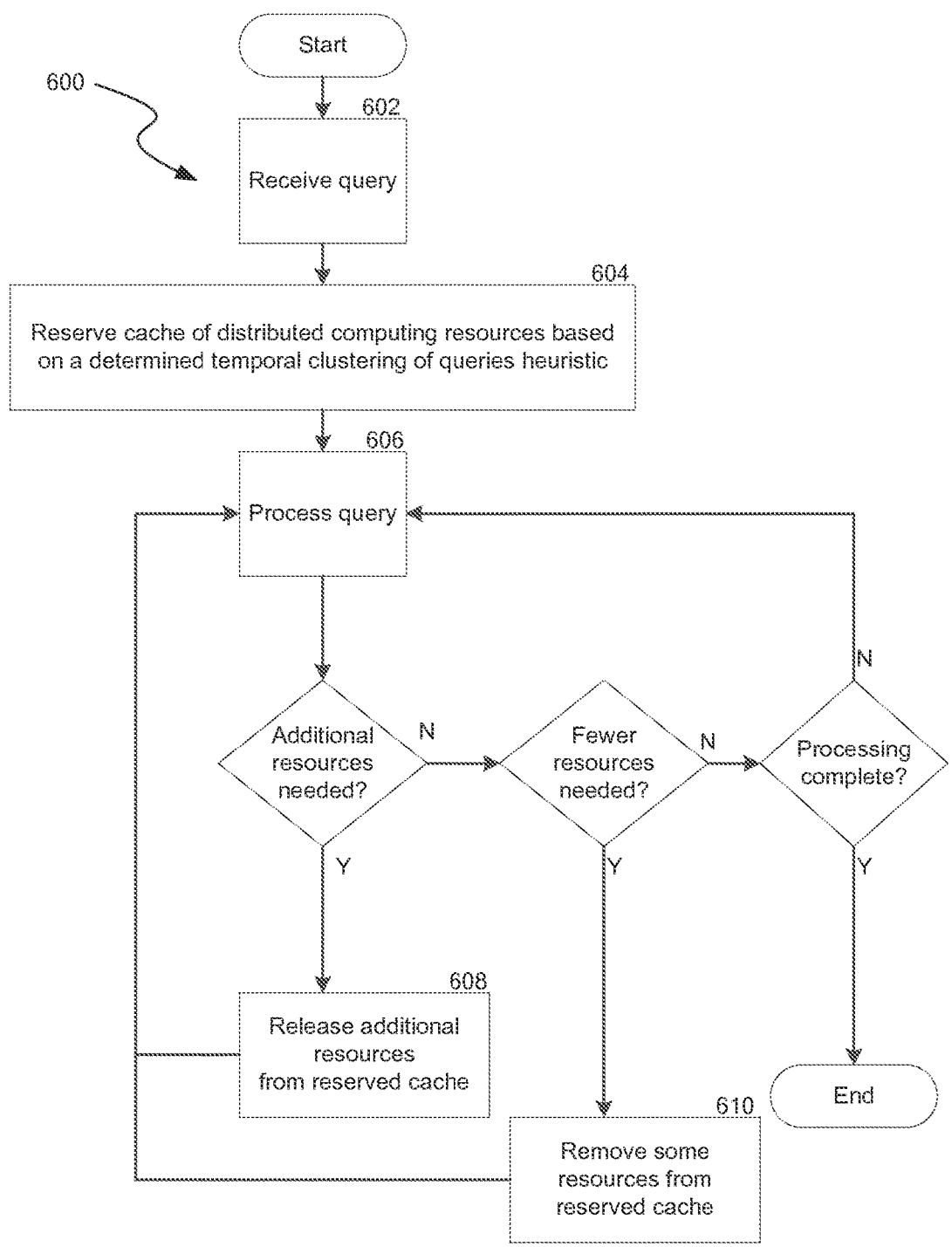
FIG. 6 shows a flow diagram illustrating an example process for resource management in a distributed computing environment that includes expandable resource reservations with caching.

FIG. 6 shows a flow diagram illustrating an example process 600 for resource management in a distributed computing environment that includes expandable resource reservations with caching, according to some embodiments. For low latency query responses, a centralized resource manager for a large distributed cluster needs to be able to provide resource responses very quickly. However, each submitted query may not accurately make an initial request for resources. If resources are allocated based on an initial request and the query overruns the allocated resources, the query may need to return to the resource manager for additional resource allocations. If this occurs multiple times it can create significant delay in query responses. Instead, low latency query responses may be provided by using resource request caching that can handle re-requests of resources. The flow chart shown in FIG. 6 represents a high-level example process 600. Process 600 may include fewer or more steps while remaining within the scope of the present disclosure.

At step 602 a resource manager receives a query from a client. The query may include requested resource allocations for processing via the distributed computing environment. At step 604 the resource manager reserves a cache of resources based on a determined temporal clustering of queries heuristic. As a sub process, the resource manager may track a history of received queries and develop a heuristic around the temporal clustering of queries. In other words, through a heuristic process of monitoring queries, a resource manager may determine that a receipt of one type of query is typically followed by a plurality of additional queries within a given time frame. For example, using a rough heuristic, a resource manager may determine that a single select query is typically followed by n number of action queries such as a column insertion or table creation. Based on the rough heuristic, the resource manager reserves a cache of available resources that can be called upon in near real time should a client's query lead to additional subsequent queries. At step 606 the resource manager allocates resources out of the reserved cache and initiates processing of the queries via data nodes in the cluster. The resource manager may periodically receive status updates from the node managers at data nodes involved in the processing of the query and/or may receive additional subsequent queries. If the resource manager determines that additional resources are needed, it can at step 608 release additional resources from the reserved cache. Again, such a determination may be based on a temporal clustering of queries heuristic. Alternatively, if the resource manager determines that fewer resources are needed, it can at step 610 remove some of the earmarked resources from the reserved cache, thereby providing additional capacity for other applications or clients. According to some embodiments, an administrator may set prioritization policies for different clients and/or applications. For example, queries from clients in department A in an enterprise setting may enjoy priority over queries from clients in department B.

By reserving a cache of resources upon receipt of an initial query, the resource manager can dynamically respond to additional resource requirements in near real time and provide a low latency query response to clients.

Updateable Resource-Based Admission Control

Figure 7:
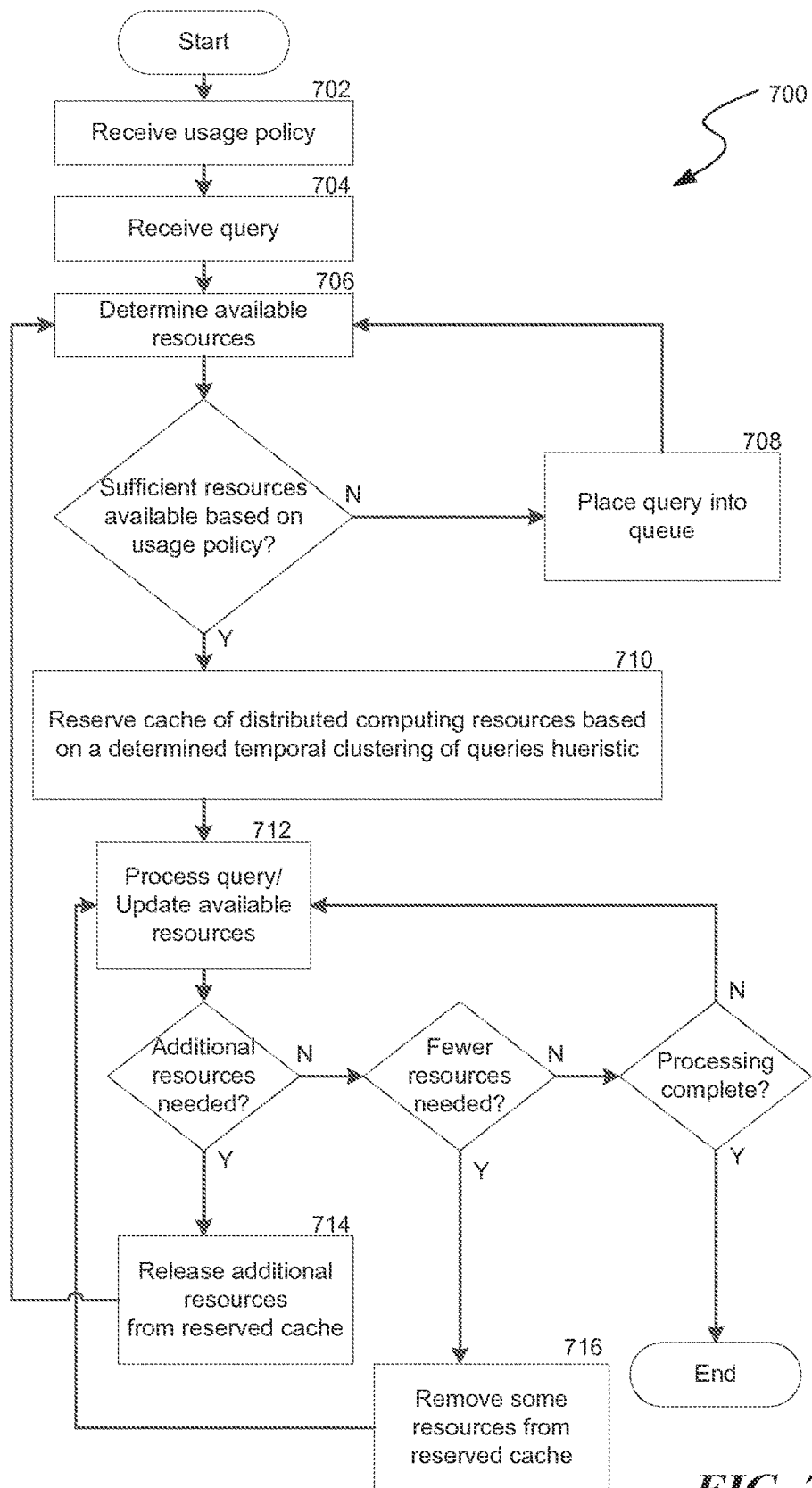
FIG. 7 shows a flow diagram illustrating an example process for resource management in a distributed computing environment that includes updateable resource-based admission controls.

FIG. 7 shows a flow diagram illustrating an example process 700 for resource management in a distributed computing environment that includes updateable resource-based admission controls. An administrator may prefer to have limit the amount of resources consumed by particular users, groups of users, or particular types of queries. Described herein is a queuing mechanism that takes into account the resources currently expended and the resource estimates available at the time to make queuing decisions that meet the administrator's goals. The flow chart shown in FIG. 7 represents a high-level example process 700. Process 700 may include fewer or more steps while remaining within the scope of the present disclosure.

At step 702 the resource manager receives a usage policy from an administrator user. For example, an administrator may set a usage policy to restrict a certain amount of resources from being expended by a particular user or group of users submitting queries. Where queries exceed such usage policies, the administrator user may prefer such queries to be queued until additional resources come available. As described earlier resources may include memory, processing, storage, and network bandwidth. An example usage policy may be "not more than 600 GB of memory at any given time by the marketing department." At step 704, the resource manager receives a query from a client user and at step 706 determines the available resources taking into consideration the received usage policy. According to some embodiments, the resource requirement for the query may be sent or negotiated by the applications master associated with the query. According to some embodiments, the resource manager may estimate the required resources based on the temporal clustering of queries heuristic described with reference to FIG. 6. If the resource manager determines that there are not sufficient resources available (within the usage policy), at step 708 the resource manager places the query into a queue until such resources become available. If sufficient resources are available, at step 710 the resource manager reserves a cache of the available resource based on the temporal clustering of queries heuristic described with reference to FIG. 6. At step 712 the resource manager allocates resources out of the reserved cache and initiates processing of the queries via data nodes in the cluster. The resource manager may periodically receive status updates from the node managers at data nodes involved in the processing of the query and/or may receive additional subsequent queries. If the resource manager determines that additional resources are needed, it can at step 714 release additional resources from the reserved cache. Again, such a determination may be based on a temporal clustering of queries heuristic. Alternatively, if the resource manager determines that fewer resources are needed, it can at step 716 remove some of the earmarked resources from the reserved cache, thereby providing additional capacity for other applications or clients. According to some embodiments, an administrator may set prioritization policies for different clients and/or applications. For example, queries from clients in department A in an enterprise setting may enjoy priority over queries from clients in department B. While processing at the data nodes at step 712, node managers may update the resource manager regarding available resources.

Optimistic Scheduling

Figure 8:
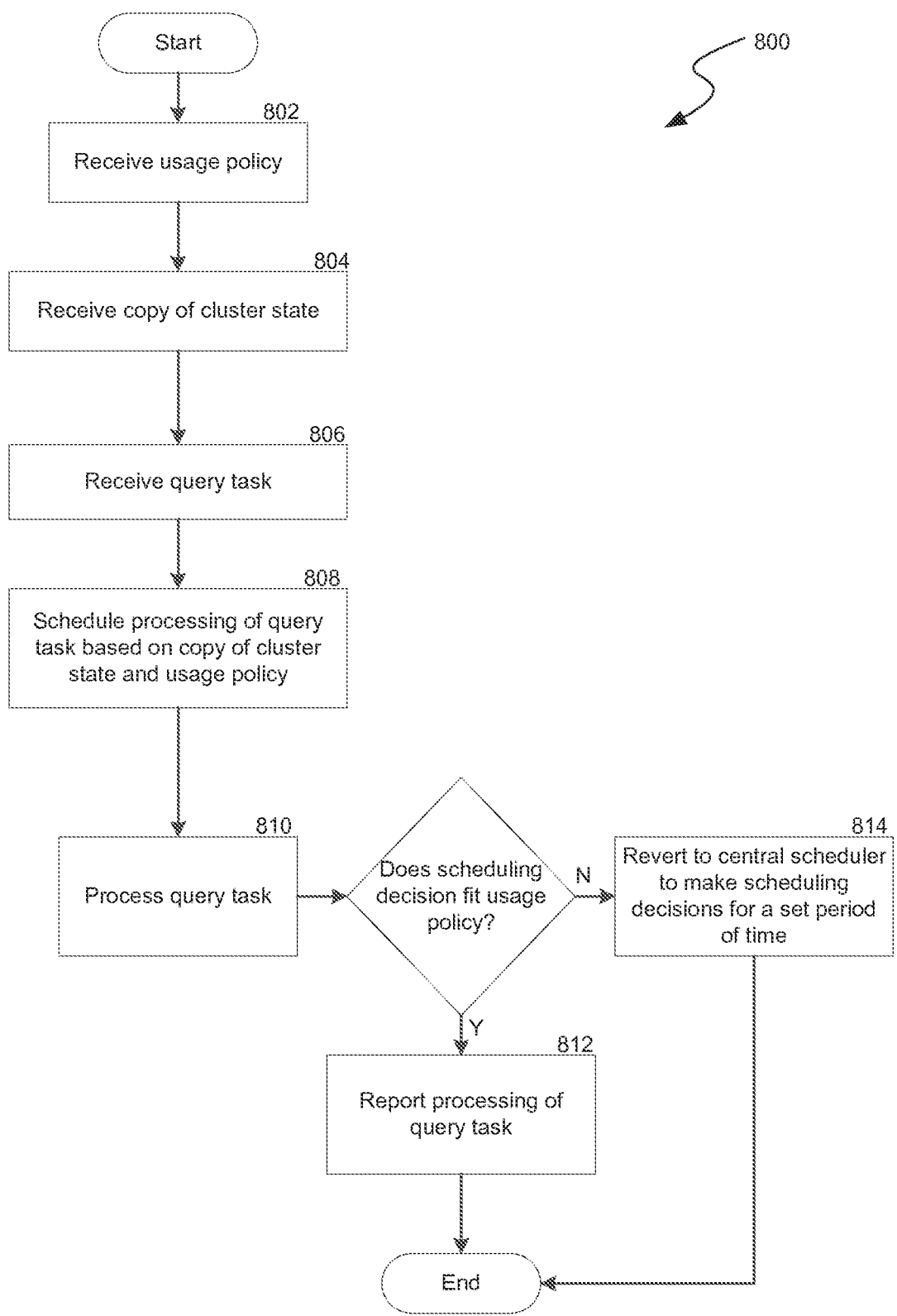
FIG. 8 shows a flow diagram illustrating an example process for resource management in a distributed computing environment that includes optimistic scheduling.

FIG. 8 shows a flow diagram illustrating an example process 800 for resource management in a distributed computing environment that includes optimistic scheduling. In large-scale distributed systems, a centralized resource manager may become a performance bottleneck for when handling high query throughput rates. In order to support extremely low latency query dispatch at very high throughput, a technique is described to distribute the scheduling decisions across the cluster while still maintaining approximate compliance with resource management policies set by an administrator. The flow chart shown in FIG. 8 represents a high-level example process 800. Process 800 may include fewer or more steps while remaining within the scope of the present disclosure.

At step 802 a resource manager daemon at a data node (e.g. a node manager 510*b*) receives a usage policy set by an administrator user. According to some embodiments, the usage policy is sent via the resource manager 108/110 at the master node. For example, an administrator may set a usage policy to restrict a certain amount of resources from being expended by a particular user or group of users submitting queries. As described earlier resources may include memory, processing, storage, and network bandwidth. An example usage policy may be "not more than 600 GB of memory at any given time by the marketing department." At step 804 the resource manager daemon at a data node receives a "stale" copy of the state of the entire cluster. According to some embodiments the stale copy of the cluster state may be a copy of data or metadata from state store 112 referenced in FIG. 1. The resource manager daemon at each data node will maintain a cached copy of the cluster state and will receive new copies at regular and/or irregular intervals such that each node manager has an approximate picture of current resource usage and allocation across all data nodes of the cluster. According to some embodiments, the state copy at each data node is updated every 5-10 seconds, however according to other embodiments a node manager may rely on state copies updated only every 2-5 minutes. At step 806 the resource manager daemon at a data node receives a query or task associated with a query. At step 808 resource manager daemon at a data node makes a task scheduling decision based on the required resources of the received query (or task), the approximate current state of the cluster, and the received usage policy. The scheduling decisions by the resource manager daemons at each data node are made independently of any scheduling decisions by the central resource manager 108/110 at the master node. In this way their scheduling decision is an "optimistic" because it assumes that the approximate state of the cluster (as provided with the stale state copy) is close enough to make a scheduling decision without central authority. If, based on the approximate state of the cluster, a node manager determines that resources are available to process the query or task within the usage policy, the node manager at step 810 begins processing the query or task at the node and/or communicates with other nodes to distribute processing tasks. If the scheduling decision is successful and fits the usage policy set by the administrator, the node manager reports the successful processing. If the scheduling decision is unsuccessful (i.e. it oversteps the usage policy), scheduling decisions for that data node immediately revert back to the central scheduler for a set period of time (e.g. 2-5 minutes).

Computer Devices/Systems

Figure 9:
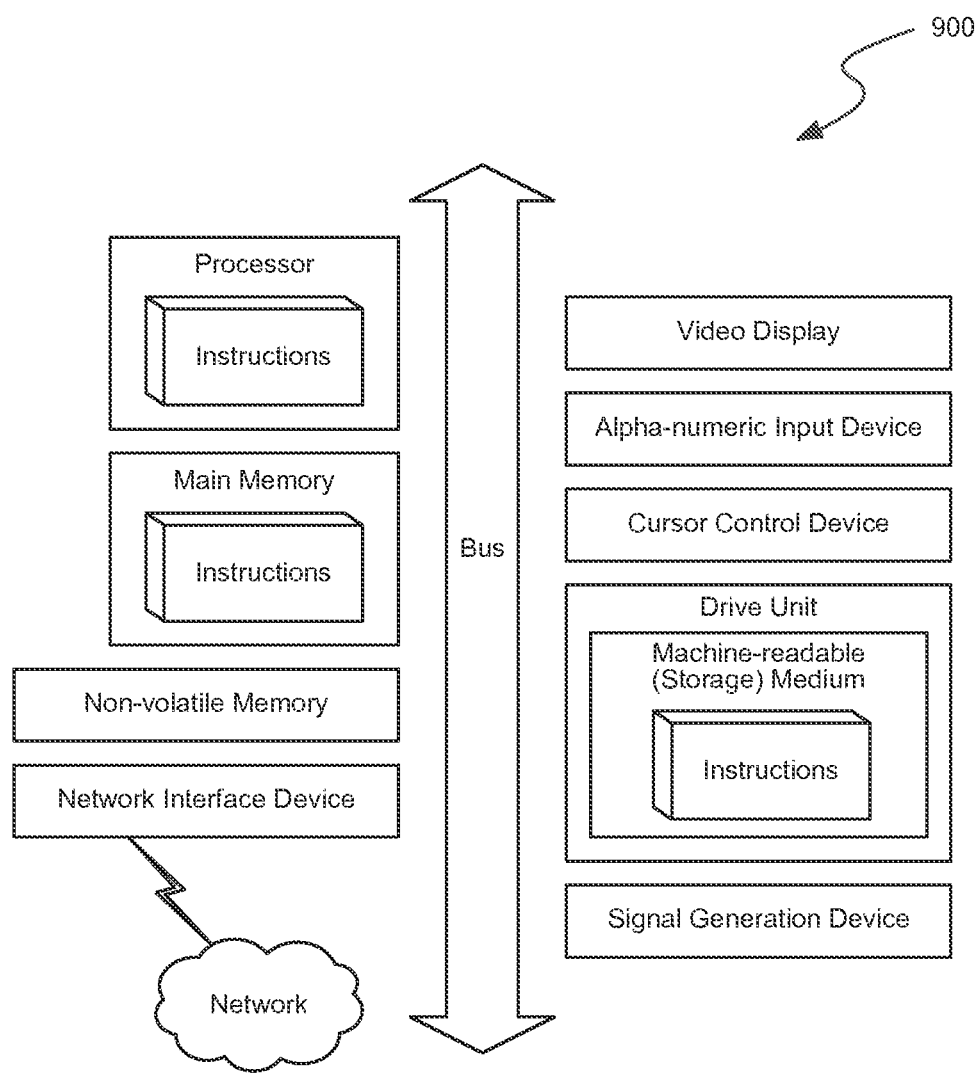
FIG. 9 shows a diagrammatic representation of a machine in the example form of a computer system within which a set of instructions, for causing the machine to perform any one or more of the methodologies discussed herein.

FIG. 9 shows a diagrammatic representation of a machine in the example form of a computer system within which a set of instructions, for causing the machine to perform any one or more of the methodologies discussed herein.

In the example of FIG. 9, the computer system 900 includes a processor, memory, non-volatile memory, and an interface device. Various common components (e.g., cache memory) are omitted for illustrative simplicity. The computer system 900 is intended to illustrate a hardware device on which any of the components depicted in the example of FIG. 1 (and any other components described in this specification) can be implemented. The computer system 900 can be of any applicable known or convenient type. The components of the computer system 900 can be coupled together via a bus or through some other known or convenient device.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 900. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the interface.

In operation, the computer system 900 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Disclaimers

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for".) Accordingly, the applicant reserves the right to add additional claims after filing the application to pursue such additional claim forms for other aspects of the disclosure.

What is claimed is:

1. A computer-implemented method for managing computing resources in a distributed computing cluster operable to execute queries on data stored in the cluster, the computing cluster having multiple data nodes storing the data, the method comprising:

instantiating the plurality of data nodes in the cluster, a respective data node operating an instance of a query engine that is capable of planning a query and executing at least a query portion that corresponds to data stored on the respective data node;

receiving, by a master node in the distributed computing cluster, an administrator usage policy, wherein the administrator usage policy includes limitations on usage of computing resources by a user and/or group of users;

receiving, by the master node, a query and an initial request for computing resources to process the query; and determining, by the master node, if sufficient computing resources are available to process the query based on the initial request for computing resources and a limitation on usage of computing resources applicable to the query and resource request based on the administrator usage policy, wherein, if sufficient resources are not available:
the master node is configured to place the query into a queue until sufficient resources are available.

2. The method of claim 1, wherein computing resources include one or more of, memory, processing power, data storage, and network bandwidth.

3. The method of claim 1, wherein the distributed computing cluster includes a distributed file system or a data store.

4. The method of claim 3, wherein the distributed computing cluster is an Apache Hadoop cluster, the distributed file system is a Hadoop Distributed File System (HDFS) and the data store is a NoSQL (No Structured Query Language) data store, wherein the NoSQL data store includes Apache HBase.

5. The method of claim 1, wherein,
if sufficient resources are available, the master node is configured to:
reserve a cache of computing resources at one or more slave nodes in the distributed computing cluster based on the initial request for resources and a heuristic associated with a temporal clustering of received queries;
allocate a first set computing resources from the reserved cache of computing resources based on the initial request for computing resources to process the query;
receive, during processing of the query, an updated computing resource request; and
if additional computing resources are required:
allocate an additional second set of computing resources from the reserved cache based on the updated resource request.

6. The method of claim 5, wherein,
if fewer resources are required:
the master node is configured to remove a third set of computing resources from the reserved cache based on the updated resource request.

7. The method of claim 5, wherein the heuristic includes a prediction of a plurality of queries to follow the received query.

* * * * *